(12) United States Patent
Kotelnikova et al.

(10) Patent No.: US 11,347,554 B1
(45) Date of Patent: May 31, 2022

(54) CONTEXT-AWARE JOB PRIORITIZATION

(71) Applicant: Snap Inc., Santa Monica, CA (US)

(72) Inventors: Irina Kotelnikova, Playa Vista, CA (US); David Liberman, Los Angeles, CA (US); Denis Ovod, Santa Monica, CA (US); Johan Lindell, East Palo Alto, CA (US)

(73) Assignee: Snap Inc., Santa Monica, CA (US)

( * ) Notice: Subject to any disclaimer, the term of this patent is extended or adjusted under 35 U.S.C. 154(b) by 105 days.

(21) Appl. No.: 16/684,075

(22) Filed: Nov. 14, 2019

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4831* (2013.01); *G06F 9/4881* (2013.01)

(58) Field of Classification Search
CPC ..... G06F 9/5038; G06F 9/4881; G06F 9/4831
See application file for complete search history.

(56) References Cited

U.S. PATENT DOCUMENTS

2006/0140205 A1* 6/2006 Baik ................... H04L 12/2821 370/412
2012/0278513 A1* 11/2012 Prevost ................ G06F 9/5038 710/39
2019/0354398 A1* 11/2019 Aggarwal ............. G06F 16/183

OTHER PUBLICATIONS

Zheng et al. "Context-Aware Scheduling Algorithm in Smart Home System". Network Technology and Application. (Year: 2012).*
Assuncao et al. "Context-aware Job Scheduling for Cloud Computing Environments". IEEE/ACM Fifth International Conference on Utility and Cloud Computing. (Year: 2012).*

* cited by examiner

*Primary Examiner* — Adam Lee
(74) *Attorney, Agent, or Firm* — Schwegman Lundberg & Woessner, P.A.

(57) ABSTRACT

Systems and methods are provided for a context-aware scheduler. In one example embodiment, the context-aware scheduler accesses a stored application context to determine that the stored application context corresponds to a change in application context from a first application context according to which a queue of jobs for execution for an application is currently prioritized, to a second application context. The context-aware scheduler determines a list of attributions comprising assigned priority categories for the second application context and uses the list of attributions for the second application context to re-prioritize the plurality of jobs in the queue based on a job attribution tag for each job in the queue. The context-aware scheduler sets a first job in the re-prioritized queue as the next job for execution for the application.

16 Claims, 8 Drawing Sheets

CONTEXT-AWARE JOB PRIORITIZATION

BACKGROUND

Scheduling jobs (e.g., tasks) to be processed by a processor of a computing device or system is a complex activity. There are various schedulers that can be used to manage jobs to be processed, such as the schedulers included in the RxJava framework. A scheduler typically has a simple queue to which jobs to be executed are inserted. The scheduler selects which job among those in the queue is to be executed (e.g., first come first serve or other method) and occupies one or more application threads to execute the job. The application threads use one or more of the computing device's processors to execute the job.

For example, an application (e.g., messaging application, image processing application, word processing application) may comprise many tasks or jobs that need to be executed to run the application. Each of the jobs that needs to be executed for the application is scheduled to the queue and the scheduler occupies one or more application threads to execute each job.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
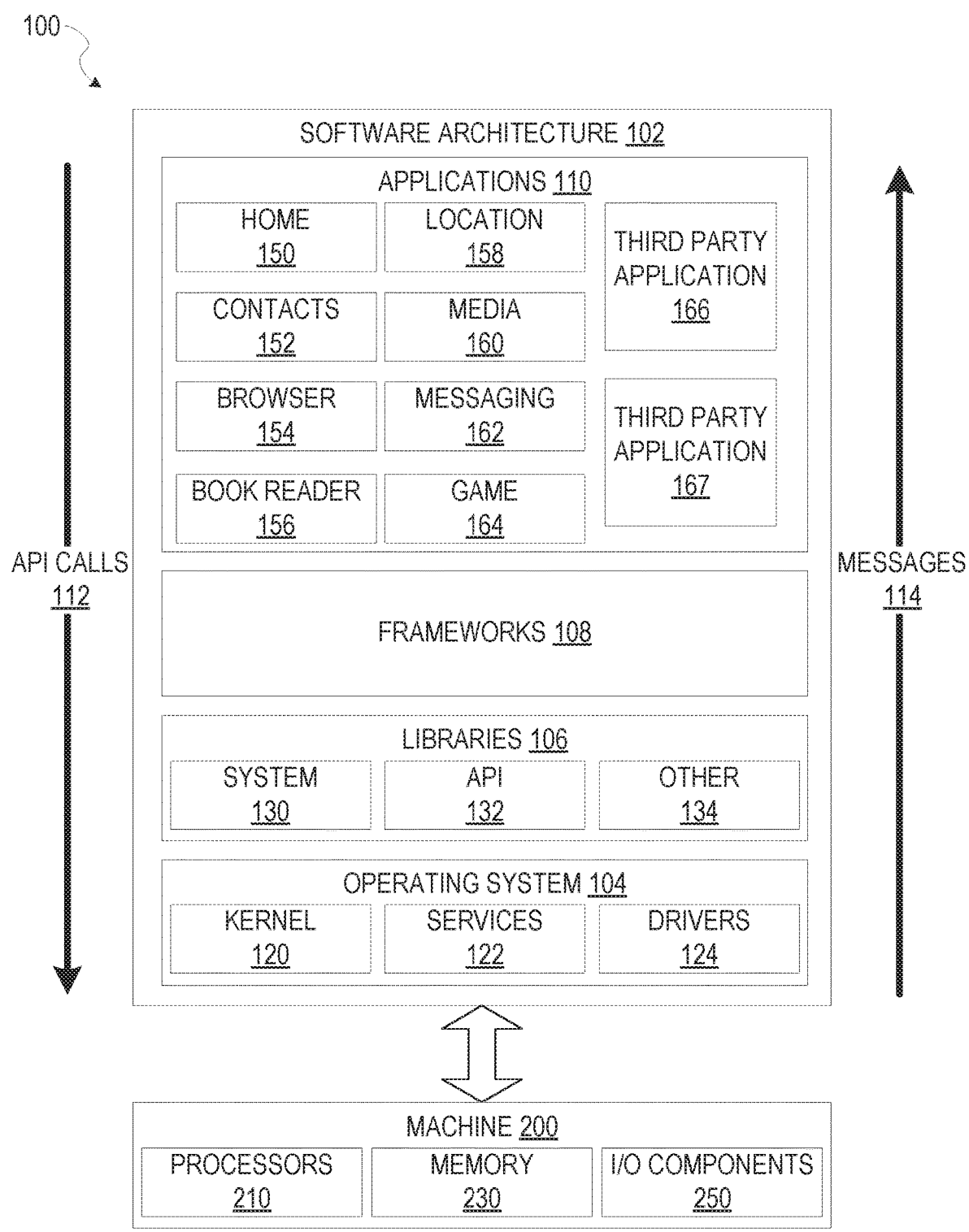
FIG. 1 is a block diagram illustrating an example of a software architecture that may be installed on a machine, according to some example embodiments.

Systems and methods described herein relate to context-aware job prioritization. As explained above, a scheduler typically has a simple queue to which tasks or jobs to be executed are inserted. The scheduler selects which task or job among those in the queue is to be executed (e.g., first come first serve or other method) and allocates one or more application threads to execute the task or job. While conventional schedules may have some ways to optimize the processing of jobs or tasks, the optimization schemes are static and do not account for a change in application state or user context. This results in less than optimal use of the computing device's resources and delays in response to a user input or request. For example, if a user is accessing a camera in a messaging application to capture a photograph or video and then switches to a chat function in the messaging application, the scheduler may finish processing previously added jobs in the queue first before starting to execute the jobs related to the chat function. Thus, the user must wait excessive time before the chat function is loaded and ready to use and there may be jobs that are executed that are not necessary to execute for the chat function.

Example embodiments address inefficiencies and response time of conventional schedulers by providing context-aware prioritization based on application context during job scheduling and/or when determining a next job for execution.

For example, in example embodiments, every job scheduled to be executed comprises a corresponding attribution tag associated to the job. The context-aware scheduler comprises additional callbacks or triggers so that as soon as an application context changes (e.g., based on user input in the application), the scheduler reacts to the change in context. For example, the scheduler detects an application context change, identifies the change in context, and prioritizes (or re-prioritizes) the jobs in the queue with an attribution associated with the change in context.

Thus, the jobs with attributions that are higher priority for the changed context are sorted in the queue such that those jobs are executed first. In this way, example embodiments provide a smarter scheduler that can quickly react to a change in application context. The scheduler can also re-prioritize the queue based on the other jobs that are scheduled to the queue when the context does not change (to ensure that the jobs with attributions that are higher priority are still sorted such that those jobs are executed first).

In other example embodiments, a scheduler detects an application context change when determining a next job for execution. For example, the scheduler accesses a stored application context to determine whether the stored application context corresponds to a change in application context from a first application context according to which the queue is currently prioritized, to a second application context. If the scheduler determines that the stored application context corresponds to a change in application context, the scheduler re-prioritizes the queue according to a list of attributions for the second application context and sets a first job in the re-prioritized queue as the next job for execution of the application.

Conducting tests using example embodiments resulted in improved central processing unit (CPU) time measurements for functionality in a messaging application.

FIG. 1 is a block diagram 100 illustrating a software architecture 102, which can be installed on any one or more computing devices, such as a client or server computer. For example, in various embodiments, client devices 410 and servers and systems 402, 412, 416, 418, 422, and 424 shown in FIG. 4 may be implemented using some or all of the elements of the software architecture 102. FIG. 1 is merely a non-limiting example of a software architecture, and it will be appreciated that many other architectures can be implemented to facilitate the functionality described herein. In various embodiments, the software architecture 102 is implemented by hardware such as a machine 200 of FIG. 2 that includes processors 210, memory 230, and input/output (I/O) components 250. In this example, the software architecture 102 can be conceptualized as a stack of layers where each layer may provide a particular functionality. For example, the software architecture 102 includes layers such as an operating system 104, libraries 106, frameworks 108, and applications 110. Operationally, the applications 110 invoke application programming interface (API) calls 112 through the software stack and receive messages 114 in response to the API calls 112, consistent with some embodiments.

In various implementations, the operating system 104 manages hardware resources and provides common services. Example operating systems include Android operating systems (e.g., Android 10), Apple operations systems (e.g., iOS, macOS), Windows operating systems (e.g., Windows 10, Windows CE), and so forth. The operating system 104 includes, for example, a kernel 120, services 122, and drivers 124.

The kernel 120 acts as an abstraction layer between the hardware and the other software layers, consistent with some embodiments. For example, the kernel 120 provides memory management, processor and thread management (e.g., scheduling via a scheduler), component management, networking, and security settings, among other functionality. As explained above, a scheduler selects which job among those in a queue of jobs is to be executed (e.g., first come first serve or other method) and allocates one or more application threads to execute the task or job. For example, the scheduler selects a next job in the queue to be allocated to one or more threads, and the one or more threads uses processors 210 of machine 200 to execute the job. The scheduler can use one or more existing application threads or run a new thread or a new thread pool. The threads occupy the kernel's capacity and the device kernel's productivity can be based on how effective the threads are managed.

The services 122 can provide other common services for the other software layers. The drivers 124 are responsible for controlling or interfacing with the underlying hardware, according to some embodiments. For instance, the drivers 124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 106 provide a low-level common infrastructure utilized by the applications 110. The libraries 106 can include system libraries 130 (e.g., C standard library) that can provide functions such as memory allocation functions, string manipulation functions, mathematic functions, and the like. In addition, the libraries 106 can include API libraries 132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 106 can also include a wide variety of other libraries 134 to provide many other APIs to the applications 110.

The frameworks 108 provide a high-level common infrastructure that can be utilized by the applications 110, according to some embodiments. For example, the frameworks 108 provide various graphic user interface (GUI) functions, high-level resource management, high-level location services, and so forth. The frameworks 108 can provide a broad spectrum of other APIs that can be utilized by the applications 110, some of which may be specific to a particular operating system 104 or platform.

In an example embodiment, the applications 110 include a home application 150, a contacts application 152, a browser application 154, a book reader application 156, a location application 158, a media application 160, a messaging application 162, a game application 164, and a broad assortment of other applications such as third-party applications 166 and 167. According to some embodiments, the applications 110 are programs that execute functions defined in the programs. Various programming languages can be employed to create one or more of the applications 110, structured in a variety of manners, such as object-oriented programming languages (e.g., Objective-C, Java, or C++) or procedural programming languages (e.g., C or assembly language). In a specific example, the third-party application 166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 166 and 167 can invoke the API calls 112 provided by the operating system 104 to facilitate functionality described herein.

Figure 4:
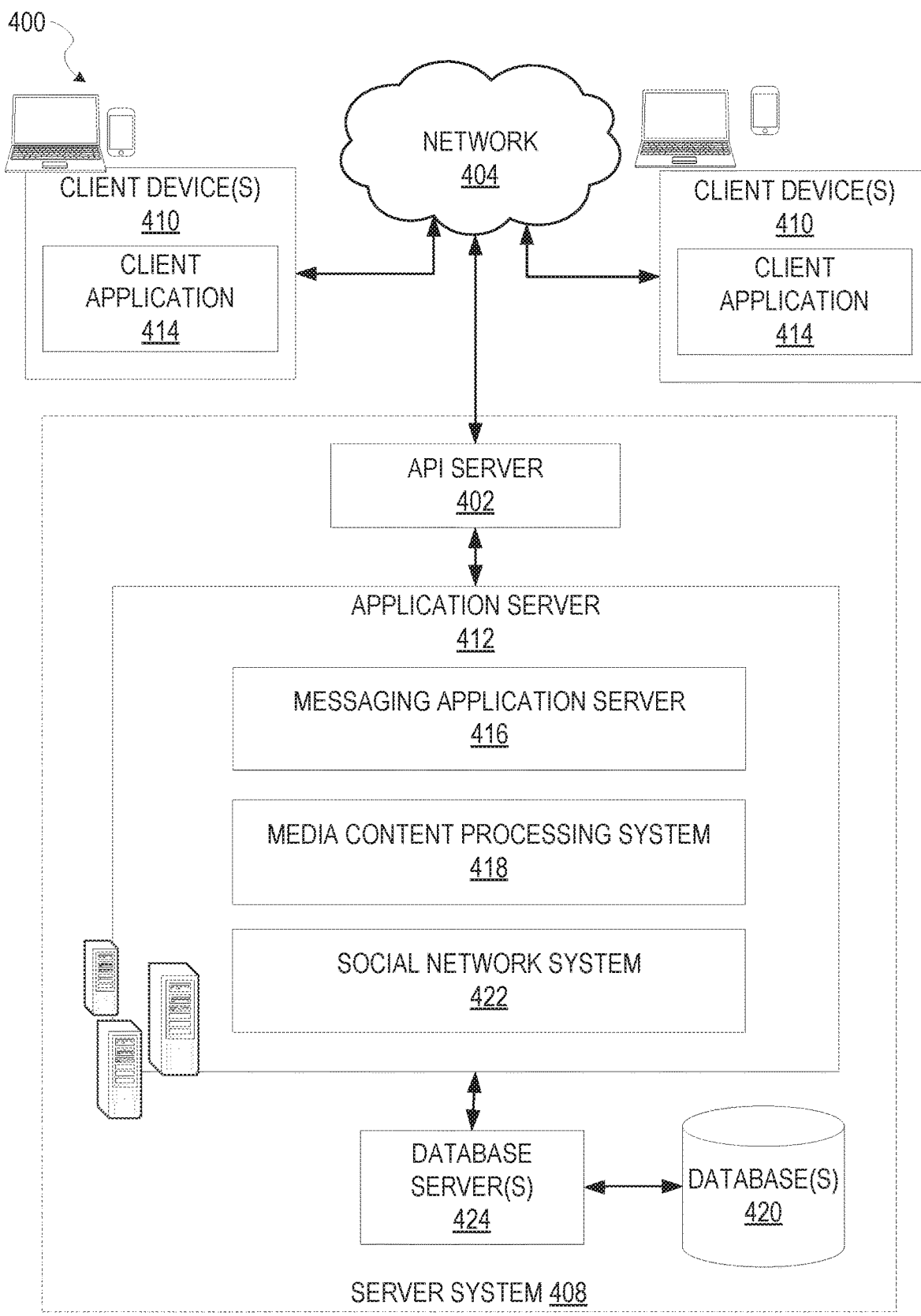
FIG. 4 is a block diagram showing an example networked system for exchanging data (e.g., messages and associated content) over a network, according to some example embodiments.

In certain embodiments, one or more applications 110 may be a standalone application that operates to manage communications with a server system, such as third-party servers or the server system 408 of FIG. 4. In other embodiments, this functionality may be integrated with another application (e.g., a third-party application 166 may be integrated with a messaging application 162). The application 110 may request and display various data related to messaging, media content, media collections, media overlays, interactive messages, chat messages, and so forth, and may provide the capability for a user to input data related to the system via a touch interface, via a keyboard, or using a camera device of the machine 200, communication with a server system via the I/O components 250, and receipt and storage of object data in the memory 230. Presentation of information and user inputs associated with the information may be managed by the application 110 using different frameworks 108, library 106 elements, or operating system 104 elements operating on the machine 200.

Figure 2:
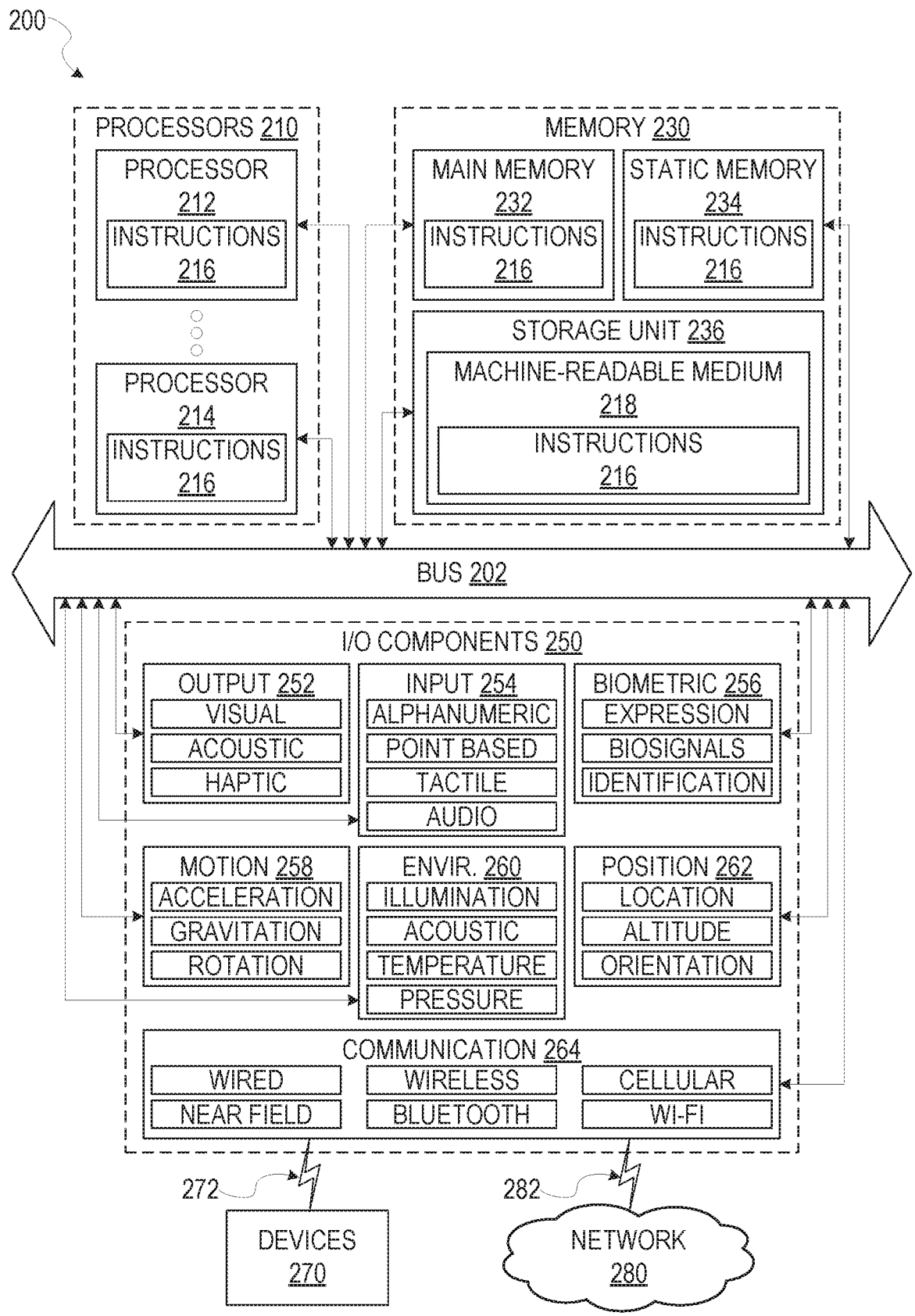
FIG. 2 illustrates a diagrammatic representation of a machine, in the form of a computer system, within which a set of instructions may be executed for causing the machine to perform any one or more of the methodologies discussed herein, according to an example embodiment.

FIG. 2 is a block diagram illustrating components of a machine 200, according to some embodiments, able to read instructions from a machine-readable medium (e.g., a machine-readable storage medium) and perform any one or more of the methodologies discussed herein. Specifically, FIG. 2 shows a diagrammatic representation of the machine 200 in the example form of a computer system, within which instructions 216 (e.g., software, a program, an application, an applet, an app, or other executable code) for causing the machine 200 to perform any one or more of the methodologies discussed herein can be executed. In alternative embodiments, the machine 200 operates as a standalone device or can be coupled (e.g., networked) to other machines. In a networked deployment, the machine 200 may operate in the capacity of a server system 402, 412, 416, 418, 422, 424, and the like, or a client device 410 in a server-client network environment, or as a peer machine in a peer-to-peer (or distributed) network environment. The machine 200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 216, sequentially or otherwise, that specify actions to be taken by the machine 200. Further, while only a single machine 200 is illustrated, the term "machine" shall also be taken to include a collection of machines 200 that individually or jointly execute the instructions 216 to perform any one or more of the methodologies discussed herein.

In various embodiments, the machine 200 comprises processors 210, memory 230, and I/O components 250, which can be configured to communicate with each other via a bus 202. In an example embodiment, the processors 210 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 212 and a processor 214 that may execute the instructions 216. The term "processor" is intended to include multi-core processors 210 that may comprise two or more independent processors 212, 214 (also referred to as "cores") that can execute instructions 216 contemporaneously. Although FIG. 2 shows multiple processors 210, the machine 200 may include a single processor 210 with a single core, a single processor 210 with multiple cores (e.g., a multi-core processor 210), multiple processors 212, 214 with a single core, multiple processors 212, 214 with multiple cores, or any combination thereof.

The memory 230 comprises a main memory 232, a static memory 234, and a storage unit 236 accessible to the processors 210 via the bus 202, according to some embodiments. The storage unit 236 can include a machine-readable medium 218 on which are stored the instructions 216 embodying any one or more of the methodologies or functions described herein. The instructions 216 can also reside, completely or at least partially, within the main memory 232, within the static memory 234, within at least one of the processors 210 (e.g., within the processor's cache memory), or any suitable combination thereof, during execution thereof by the machine 200. Accordingly, in various embodiments, the main memory 232, the static memory 234, and the processors 210 are considered machine-readable media 218.

As used herein, the term "memory" refers to a machine-readable medium 218 able to store data temporarily or permanently and may be taken to include, but not be limited to, random-access memory (RAM), read-only memory (ROM), buffer memory, flash memory, and cache memory. While the machine-readable medium 218 is shown, in an example embodiment, to be a single medium, the term "machine-readable medium" should be taken to include a single medium or multiple media (e.g., a centralized or distributed database, or associated caches and servers) able to store the instructions 216. The term "machine-readable medium" shall also be taken to include any medium, or combination of multiple media, that is capable of storing instructions (e.g., instructions 216) for execution by a machine (e.g., machine 200), such that the instructions 216, when executed by one or more processors of the machine 200 (e.g., processors 210), cause the machine 200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 250 include a wide variety of components to receive input, provide output, produce output, transmit information, exchange information, capture measurements, and so on. In general, it will be appreciated that the I/O components 250 can include many other components that are not shown in FIG. 2. The I/O components 250 are grouped according to functionality merely for simplifying the following discussion, and the grouping is in no way limiting. In various example embodiments, the I/O components 250 include output components 252 and input components 254. The output components 252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 250 include biometric components 256, motion components 258, environmental components 260, or position components 262, among a wide array of other components. For example, the biometric components 256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 258 include acceleration sensor components (e.g., accelerometer), gravitation sensor components, rotation sensor components (e.g., gyroscope), and so forth. The environmental components 260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 250 may include communication components 264 operable to couple the machine 200 to a network 280 or devices 270 via a coupling 282 and a coupling 272, respectively. For example, the communication components 264 include a network interface component or another suitable device to interface with the network 280. In further examples, communication components 264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 270 may be another machine 200 or any of a wide variety of peripheral devices (e.g., a peripheral device coupled via a Universal Serial Bus (USB)).

Moreover, in some embodiments, the communication components 264 detect identifiers or include components operable to detect identifiers. For example, the communication components 264 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 264, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 280 or a portion of the network 280 may include a wireless or cellular network, and the coupling 282 may be a Code Division Multiple Access (CDMA) connection, a Global System for Mobile communications (GSM) connection, or another type of cellular or wireless coupling. In this example, the coupling 282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 216 are transmitted or received over the network 280 using a transmission medium via a network interface device (e.g., a network interface component included in the communication components 264) and utilizing any one of a number of well-known transfer protocols (e.g., Hypertext Transfer Protocol (HTTP)). Similarly, in other example embodiments, the instructions 216 are transmitted or received using a transmission medium via the coupling 272 (e.g., a peer-to-peer coupling) to the devices 270. The term "transmission medium" shall be taken to include any intangible medium that is capable of storing, encoding, or carrying the instructions 216 for execution by the machine 200, and includes digital or analog communications signals or other intangible media to facilitate communication of such software.

Furthermore, the machine-readable medium 218 is non-transitory (in other words, not having any transitory signals) in that it does not embody a propagating signal. However, labeling the machine-readable medium 218 "non-transitory" should not be construed to mean that the medium is incapable of movement; the machine-readable medium 218 should be considered as being transportable from one physical location to another. Additionally, since the machine-readable medium 218 is tangible, the machine-readable medium 218 may be considered to be a machine-readable device.

Figure 3:
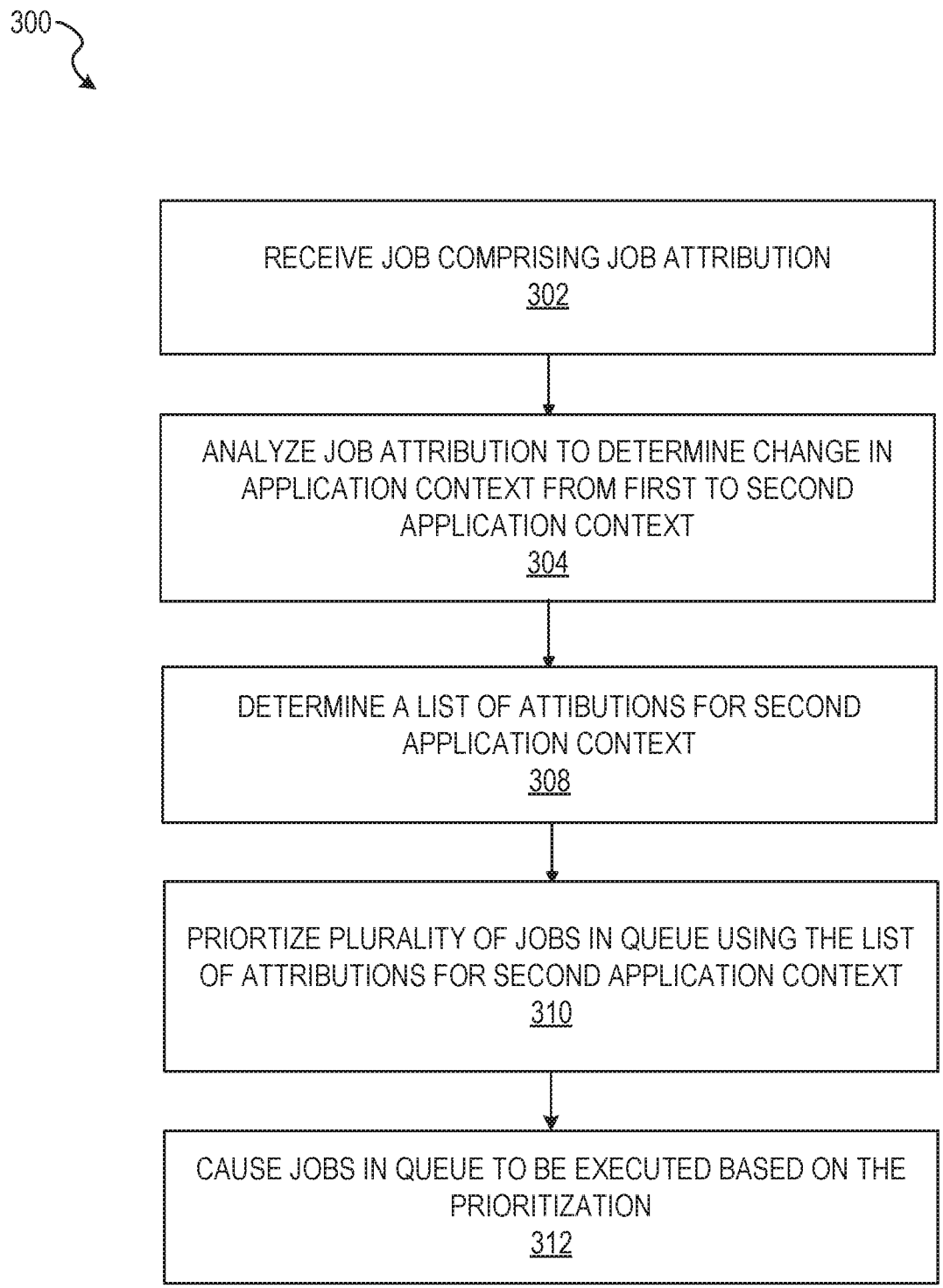
FIG. 3 is a flow chart illustrating aspects of a method, according to some example embodiments.

FIG. 3 is a flow chart illustrating aspects of a method 300, according to some example embodiments. For illustrative purposes, the method 300 is described with respect to the software architecture 102 of FIG. 1 and the machine of FIG. 2. It is to be understood that the method 300 may be practiced with other system configurations in other embodiments.

In operation 302, a computing device (e.g., machine 200, such as client device 410) receives a job comprising a job attribution tag. For example, a scheduler (e.g., context-aware scheduler as part of the operating system 104 of the machine 200) receives a job comprising a job attribution tag, where the job attribution tag corresponds to a module of an application. In example embodiments, the term "scheduler" and "context-aware scheduler" are used interchangeably.

In one example embodiment, the computing device comprises a component (e.g., an observation component) that observes a stream of events occurring in the application. The observation component can send a notice to the scheduler about certain events occurring in the application. For example, the observation component can send a job comprising, among other things, a job attribution tag. The job attribution tag corresponds to a particular module or function of the application. For example, each module or function of the application (e.g., image capture, chat, news feed) can have a corresponding job attribution tag.

In one example, the observer component is an observable in an RxJava framework. The RxJava framework (e.g., Reactive Extensions for the JVM (Java Virtual Machine), comprises a library for composing asynchronous and event-based programs using observable sequences for the JVM. Schedulers are some of the main components in the RxJava framework. The schedulers are responsible for performing operations of observables on different application threads to allow an application to work faster and more efficiently. Schedulers are used to schedule some jobs to be performed as soon as possible or at a given point in the future. In this example, the observable detects a task being activated in the application and sends a job to a scheduler corresponding to the task. The job includes, among other things, the job attribution tag corresponding to the task. The scheduler receives the job from the observable.

As explained above, a scheduler manages a queue of jobs for execution. For example, the queue may comprise a plurality of jobs for execution. In example embodiments, each job comprises an attribution tag indicating a module of the application that scheduled the job. For example, a messaging application may have a camera module with functionality for capturing an image or video, a chat module with functionality for messaging between users, a media collection module with functionality for generating and viewing media collections, and so forth. Using this example, each job for the messaging application comprises an attribution tag indicating one of the modules (e.g., capture, chat, medcoll). It is to be understood that an application can have different types of modules and functionality than those in this messaging application example.

In one example, the computing device uses RxJava call-sites (or similar functionality). A call-site keeps information about a functional module of an application from which a job was initiated. In this example, an attribution is included in a call-site. An observation component (e.g., observable) observes the jobs or tasks and passes each job or task to a scheduler. The scheduler receives the attribution and the context from the call-site.

In operation 304, the computing device (e.g., via the scheduler) analyzes the job attribution tag to determine whether the job attribution tag corresponds to a change in application context (e.g., from a first application context to a second application context). In one example, the change in application context is based on input made by a user interacting with the application. For example, a user may be using an application to perform one type of functionality and switch to another type of functionality in the application. For instance, the first application context corresponds to a first function of the application and the second application context corresponds to a second function of the application.

Using the messaging application as an example, a user may be using a camera to capture an image or video (e.g., camera functionality) within the messaging application and then switch to initiating a chat session with one or more other users (e.g., chat functionality) within the messaging application. For example, the user may interact with a graphical user interface (GUI) of the application (e.g., by selecting an icon or menu item for the chat functionality). The scheduler receives a job related to the initiation of the chat session with a job attribution tag related to that functionality. In one example embodiment, a stored application context can be updated each time an application context changes, as explained further below.

The computing device detects that the job attribution tag corresponds to a new application context that is different than a previous application context (or may be a first application context when the application is first initiated by the computing device or user). For example, the application may have been (or currently is) operating in a first application context (e.g., camera) and the new job corresponds to a second application context (e.g., chat). The computing device detects that the job attribution tag corresponds to a change in an application context from the first application context to the second application context (e.g., determines that the job attribution tag is different from a job attribution tag corresponding to a current application context).

In response to determining that the job attribution tag corresponds to a change in application context, the computing device (e.g., via the scheduler) determines a list of attributions comprising assigned priority categories for the changed (e.g., second) application context, in operation 308. For example, the computing device accesses a set of lists, each list corresponding to a respective application context. The computing device selects one of the lists that corresponds to the changed (e.g., second) application context. In one example, a list may correspond to more than one application context.

In one example embodiment, the list comprises priorities for jobs based on a corresponding attribution. For example, the list may have high, medium, and low priority categories with a list of attributions for each category. An example list for a chat module and functionality may read as follows:
HIGH
preferences/loginsignup/chat
MEDIUM
Appdb
LOW
any other In this example, there are three priority categories: HIGH, MEDIUM, and LOW. In the HIGH priority category, three attributions are listed for preferences, loginsignup, and chat, in the MEDIUM priority category, one attribution is listed for Appdb, and in the LOW priority category any other attributes are included. Thus, in a chat application context, jobs with attributions of preferences, loginsignup, and chat are given a high priority (e.g., executed first); jobs with an attribution of Appdb are given a medium priority (e.g., executed after high priority jobs); and jobs with attributions other than what is listed for the HIGH and MEDIUM priority are given a low priority (e.g., executed after high and low priority jobs). In this way, jobs that are higher priority for the current application context are sorted so that those jobs are executed first. It is to be understood that this is just one example of a list. A list can comprise different or more or less priority categories (e.g., HIGH, MEDIUMHIGH, MEDIUM, MEDIUMLOW, NOEXECUTION) and the attributions for each priority category can vary based on application, device type, operating system, user preferences, and so forth.

In one example, a priority category can include an indication (e.g., NOEXECUTION) that jobs with listed attributions should not be executed within the application context corresponding to the list. For example, certain jobs can be held until a different application context.

In one example embodiment, the set of lists are generated in advance and stored for access by the computing device (e.g., via the scheduler). A list can be generated for each of a plurality of application contexts (e.g., application modules, functions, or features). In one example embodiment, a list can correspond to more than one application context. In this way, priorities can be easily and quickly updated by simply updating one or more lists, and new lists can be easily added for new or updated functionality. Moreover, different scenarios can be tested easily to see what priorities result in the most efficient processing. For example, several different priority scenarios can be tested to see which result in the most efficient processing and then the best priorities scenarios can be used as final lists. In one example embodiment, different lists can also correspond to different types of computing devices or device state. For example, different priority scenarios may work better depending on a computing device's capabilities (e.g., processing power) or device state (e.g. low battery mode or running connected to a power source).

In one example embodiment, with a system utilizing multiple threads for processing, a dedicated thread can be reserved including within a thread pool for high priority jobs only or wait for a short period of time to check if other jobs appear in the same time range before running lower priority jobs.

In operation 310, the computing device (e.g., via the scheduler) prioritizes the plurality of jobs in the queue using the list of attributions for the second application context. The prioritization includes prioritizing the received job (e.g., first job) in the queue. As explained above, the queue comprises a plurality of jobs for execution. Each job comprises an attribution tag indicating a module of the application that scheduled the job. For instance, the computing device sorts the jobs in the queue according to the priority categories and the attributions for each job. Using a simple example, there may be five jobs in the queue, each with a corresponding attribution tag, such as Job 1 (capture), Job 2 (Appdb), Job 3 (chat), Job 4 (preferences), Job 5 (chat). Using the example list above for a chat application context, the computing device prioritizes the five jobs in the queue in the following way: Job 3, Job 4, Job 5, Job 2, Job 1. Note that there may be other optimizations made within the priority categories that are not indicated in this example.

In operation 312, the computing device (e.g., via the scheduler) causes the jobs in the queue to be executed based on the prioritization (e.g., in priority order). For example, the scheduler executes the jobs in the application's threads.

In this embodiment, each time a new job is detected or received, the computing device either re-prioritizes the queue based on a change in application content or places the job in the queue based on the priority order of the current application context when there is no change in application context. For example, the computing device receives a second job comprising a second job attribution, the second job attribution corresponding to a module of the application, analyzes the second job attribution to determine that the second job attribution corresponds to a change in application context from the second application context to a third application context, and determines a second list of attributions comprising assigned priority categories for the third application context. Using the second list of attributions for the third application context, the computing device prioritizes a plurality of jobs in the queue comprising the plurality of jobs for execution for the application, each job of the plurality of jobs comprising an attribution tag indicating a module of the application that scheduled the job. The computing device causes the jobs in the queue to be executed based on the prioritization.

In the scenario where the computing device receives a new job and determines there is no change in application context, the computing device places the job in the queue based on the priority order of the current application context. For example, the computing device receives a second job comprising a second job attribution, the second job attribution corresponding to the module of the application, analyzes the second job attribution to determine that the second job attribution does not correspond to a change in application context, and using the first list of attributions for the second application context, prioritizes the second job in the queue (e.g., inserts the second job in the queue based on the second job attribution tag). The computing device continues to cause the jobs in the queue to be executed based on the prioritization.

In one example embodiment, the computing device (e.g., via context-aware scheduler) can determine if a queue should be re-prioritized when the context-aware scheduler is determining a next job for execution. For example, an application thread may free up (e.g., finish executing an existing job) and before the scheduler chooses the next job to assign to the application thread, the scheduler determines whether an application context has changed from the application context according to which the queue is currently prioritized, to a different application context. In one example embodiment, the computing device determines if a queue should be re-prioritized when the context-aware scheduler is determining a next job for execution in addition to determining if a queue should be re-prioritized when adding a job to the queue (as described above). In another example embodiment, the computing device only determines if a queue should be re-prioritized when the context-aware scheduler is determining a next job for execution.

Figure 8:
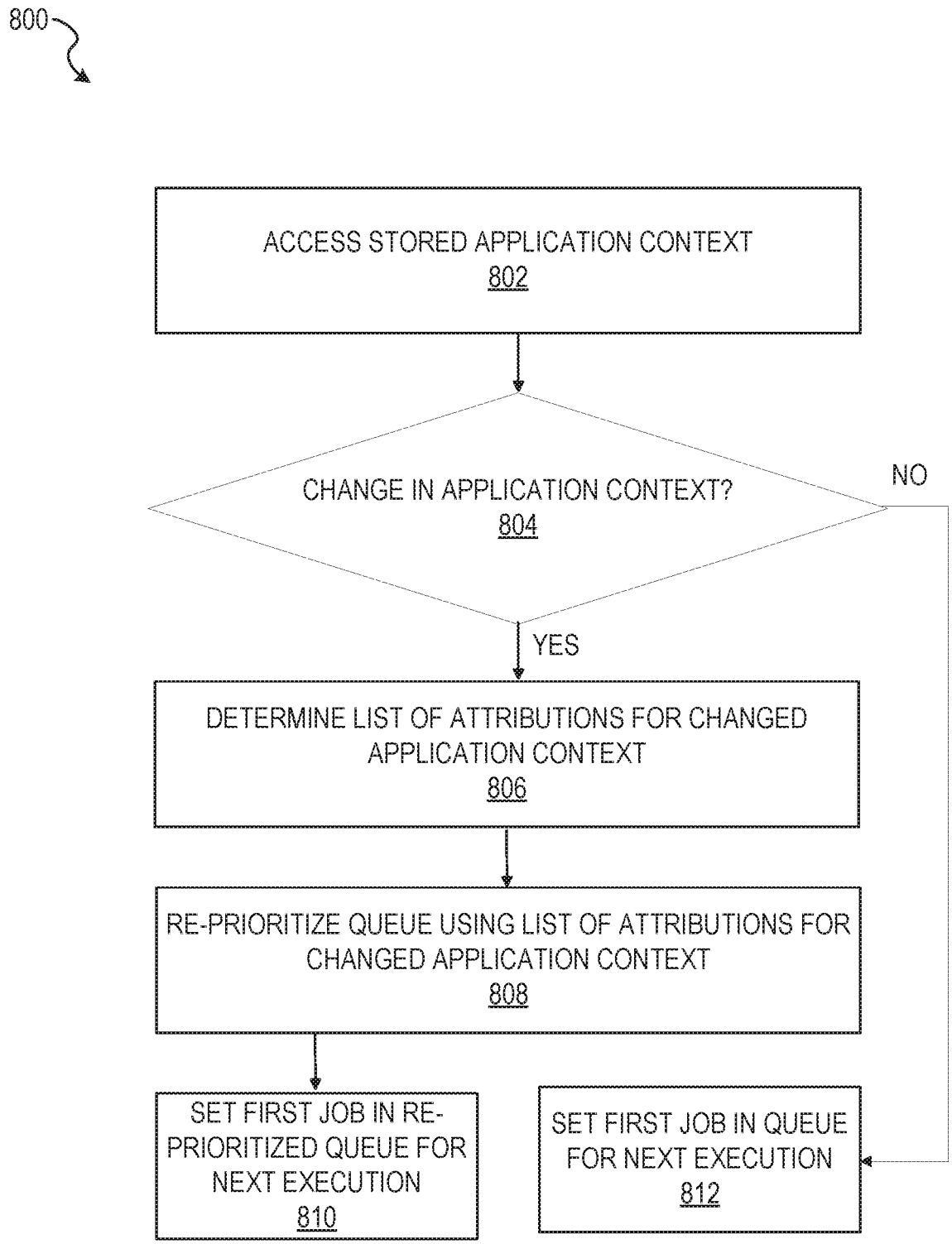
FIG. 8 is a flow chart illustrating aspects of a method, according to some example embodiments.

FIG. 8 is a flow chart illustrating aspects of a method 800 for checking application context when determining a next job to execute, according to some example embodiments. For illustrative purposes, the method 800 is described with respect to the software architecture 102 of FIG. 1 and the machine of FIG. 2. It is to be understood that the method 800 may be practiced with other system configurations in other embodiments.

In operation 802, when determining a next job for execution, the computing device (e.g., via a context-aware scheduler) accesses a stored application context. In one example embodiment, the computing device stores a context of an application in memory. In one example, a context of an application comprises a user-oriented global set of data about an application state. For example, a user-oriented global set of data about an application state comprises information about currently visible user interface (UI) page and current UI animation targets, flags to mark ongoing processes (e.g., "loading"), image or video capture, and so forth. In one example embodiment, the application context comprises an indication (e.g., variable, set of data) of an application context corresponding to a function or module of the application (e.g., chat, Appdb, preferences) that map to attribution tags. In one example embodiment, the application context can comprise a variable that maps to one of a plurality predefined attribution tags, each attribution tag corresponding to a function or module of the application, as explained above. In one example embodiment, the application context is dynamic and thus, constantly updated based on actions and functions occurring in the application (e.g., user input, data received from a server, and so forth).

In operation 804, the computing device determines whether there is a change in application context. For example, the computing device determines whether the stored application context corresponds to a change in application context from a first application context according to which the queue is currently prioritized, to a second application context. If the computing device determines that the stored application context does not correspond to a change in application context (e.g., the stored application context corresponds to the first application context according to which the queue is currently prioritized), the computing device sets the first job in the queue as the next job for execution for the application without re-prioritizing the queue, in operation 812.

If the computing device determines that the stored application context corresponds to a change in application context from a first application context according to which the queue is currently prioritized, to a second application context, in operation 806, the computing device determines a list of attributes for the changed application context. For example, the computing device determines a list of attributions comprising assigned priority categories for the second application context, as described above. In operation 808, the computing device re-prioritizes the queue using the list of attributions for the changed application context. For example, using the list of attributions for the second application context, the computing device re-prioritizes the plurality of jobs in the queue based on the job attribution tag for each job of the plurality of jobs, as also described above. In operation 810, the computing device sets the first job in the re-prioritized queue for next execution. For example, the computing device sets the first job in the re-prioritized queue as the next job for execution for the application (e.g., assigns to an available application thread).

In one example embodiment, the computing device can determine a predicted next application context and re-prioritize the queue based on the predicted next application context. For example, the computing device may be able to predict a new application context based on user behavior (e.g., a user opens an application for the first time and goes to a chat functionality, the computing device may be able to predict a next context of chat in the case where a user opens an application for the first time), user preferences, a typical order of use of functionality within an application, or the like. In this example, the computing device predicts the next application context and then re-prioritizes the queue based on a list corresponding to the predicted next application context, as explained above.

In one example embodiment, the application being executed is a messaging application or other application in a context sharing platform or messaging system. FIG. 4 is a block diagram illustrating a networked system 400 (e.g., a content sharing platform or messaging system) for exchanging data (e.g., messages and associated content) over a network. The networked system 400 includes multiple client devices 410, each of which hosts a number of client applications 414. Each client application 414 is communicatively coupled to other instances of the client application 414 and a server system 408 via a network 404.

The client device 410 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 400. In some embodiments, the client device 410 may comprise a display module (not shown) to display information (e.g., in the form of user interfaces). In further embodiments, the client device 410 may comprise one or more of touch screens, accelerometers, gyroscopes, cameras, microphones, Global Positioning System (GPS) devices, and so forth.

The client device 410 may be a device of a user that is used to create media content items such as video, images (e.g., photographs), audio, and media overlays and to send and receive messages containing such media content items, text, media overlays, and so forth, to and from other users. The client device 410 may be a device of a user that is used to create and edit messages comprising media content, including video, one or more images (e.g., photographs), media overlays or other creative tools, text, and so forth (each of which may be considered functionality or modules for different application contexts). The client device 410 may further be a device of a user that is used to view and generate interactive messages, view other users on a map, chat (e.g., exchange text messages) with other users of the system, generate and view event invites, join an event, receive notifications related to an event, and so forth (each of which may be considered functionality or modules for different application contexts).

One or more users may be a person, a machine, or other means of interacting with the client device 410. In example embodiments, the user may not be part of the system 400 but may interact with the system 400 via the client device 410 or other means. For instance, the user may provide input (e.g., touch screen input or alphanumeric input) to the client device 410, and the input may be communicated to other entities in the system 400 (e.g., third-party servers, the server system 408, etc.) via the network 404. In this instance, the other entities in the system 400, in response to receiving the input from the user, may communicate information to the client device 410 via the network 404 to be presented to the user. In this way, the user may interact with the various entities in the system 400 using the client device 410.

The system 400 may further include the network 404. One or more portions of the network 404 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 410 may access the various data and applications provided by other entities in the system 400 via a web client (e.g., a browser, such as the Internet Explorer® browser developed by Microsoft® Corporation of Redmond, Wash. State) or one or more client applications 414. The client device 410 may include one or more client applications 414 (also referred to as "apps") such as, but not limited to, a web browser, a messaging application, an electronic mail (email) application, an e-commerce site application, a mapping or location application, a media overlay application, an interactive messaging application, an image or video capture application, an event planning application, and the like.

In some embodiments, one or more client applications 414 may be included in a given one of the client devices 410, and configured to locally provide a user interface and at least some of the functionalities of the application, with the client application 414 configured to communicate with other entities in the system 400 (e.g., third-party servers, the server system 408, etc.), on an as-needed basis, for data and/or processing capabilities not locally available (e.g., to process user queries, to authenticate a user, to verify a method of payment, etc.). Conversely, one or more client applications 414 may not be included in the client device 410, and then the client device 410 may use its web browser to access the one or more applications hosted on other entities in the system 400 (e.g., third-party servers, the server system 408, etc.).

In one example, a client application 414 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 40 seconds, 24 hours). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event), or lasting another predetermined time).

An ephemeral message may be associated with a message duration parameter, the value of which determines an amount of time that the ephemeral message will be displayed to a receiving user of the ephemeral message by the client application 414. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 408 may provide server-side functionality via the network 404 (e.g., the Internet or a wide area network (WAN)) to one or more client devices 410 and/or one or more third-party servers (not shown). The server system 408 may include an application programming interface (API) server 402, an application server 412, a messaging application server 416, a media content processing system 418, and a social network system 422, which may be communicatively coupled with each other and with one or more data storages, such as one or more databases 420.

The server system 408 may be a cloud computing environment, according to some example embodiments. The server system 408, and any servers associated with the server system 408, may be associated with a cloud-based application, in one example embodiment.

The one or more databases 420 may be storage devices that store information such as untreated media content, original media content from users (e.g., high-quality media content), processed media content (e.g., media content that is formatted for sharing with client devices 410 and viewing on client devices 410), context data related to a media content item, context data related to a user device (e.g., a computing or client device 410), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, event details and tokens, and so forth. The one or more databases 420 may further store information related to third-party servers, third-party applications, client devices 410, client applications 414, users, and so forth.

The one or more databases 420 may include cloud-based storage external to the server system 408 (e.g., hosted by one or more third-party entities external to the server system 408). While the storage devices are shown as database(s) 420, it is to be understood that the system 400 may access and store data in storage devices such as databases 420, blob storages, and other types of storage methods.

The system 400 may further include one or more third-party servers (not shown). The one or more third-party servers may include one or more third-party applications. The one or more third-party applications, executing on the third-party server(s), may interact with the server system 408 via the API server 402 via a programmatic interface provided by the API server 402. For example, one or more of the third-party applications may request and utilize information from the server system 408 via the API server 402 to support one or more features or functions on a website hosted by a third party or an application hosted by the third party. The third-party website or application, for example, may provide functionality that is supported by relevant functionality and data in the server system 408.

Accordingly, each client application 414 is able to communicate and exchange data with other client applications 414 and with the server system 408 via the network 404. The data exchanged between client applications 414, and between a client application 414 and the server system 408, includes functions (e.g., commands to invoke functions) as well as payload data (e.g., text, audio, video, or other multimedia data).

The server system 408 provides server-side functionality via the network 404 to a particular client application 414. While certain functions of the system 400 are described herein as being performed either by a client application 414 or by the server system 408, it will be appreciated that the location of certain functionality either within the client application 414 or within the server system 408 is a design choice. For example, it may be technically preferable to initially deploy certain technology and functionality within the server system 408, but to later migrate this technology and functionality to the client application 414 where a client device 410 has a sufficient processing capacity.

The server system 408 supports various services and operations that are provided to the client application 414. Such operations include transmitting data to, receiving data from, and processing data generated by the client application 414. This data may include message content, client device information, geolocation information, media annotation and overlays, message content persistence conditions, social network information, live event information, date and time stamps, media content (e.g., video and images), media content data (e.g., data associated with video and images), and interactive message usage data, event planning data, as examples. Data exchanges within the networked system 400 are invoked and controlled through functions available via user interfaces (UIs) of the client application 414.

In the server system 408, the API server 402 is coupled to, and provides a programmatic interface to, the application server 412. The application server 412 is communicatively coupled to a database server 424, which facilitates access to the one or more databases 420 in which is stored data associated with messages processed by the application server 412.

The API server 402 receives and transmits message data (e.g., commands and message payloads) between the client device 410 and the application server 412. Specifically, the API server 402 provides a set of interfaces (e.g., routines and protocols) that can be called or queried by the client application 414 in order to invoke functionality of the application server 412. The API server 402 exposes various functions supported by the application server 412, including account registration; login functionality; the sending of messages, via the application server 412, from a particular client application 414 to another client application 414; the sending of media files (e.g., images or video) from a client application 414 to the messaging application server 416, for possible access by another client application 414; the setting of a collection of media data (e.g., a gallery, story, message collection, or media collection); the retrieval of such collections; the retrieval of a list of friends of a user of a client device 410; the retrieval of messages and content; the adding of friends to and deletion of friends from a social graph; the location of friends within a social graph; opening an application event (e.g., relating to the client application 414); mapping data; the creation and generation of a media overlay, and so forth.

The application server 412 hosts a number of applications and subsystems, including the messaging application server 416, the media content processing system 418, and the social network system 422. The messaging application server 416 implements a number of message processing technologies and functions, particularly related to the aggregation and other processing of content (e.g., textual and multimedia content) included in messages received from multiple instances of the client application 414. The text and media content from multiple sources may be aggregated into collections of content (e.g., called stories, galleries, or media collections). These collections are then made available, by the messaging application server 416, to the client application 414. Other processor- and memory-intensive processing of data may also be performed server-side by the messaging application server 416, in view of the hardware requirements for such processing.

The application server 412 also includes the media content processing system 418, which is dedicated to performing various media content processing operations, typically with respect to images or video received within the payload of a message at the messaging application server 416. The media content processing system 418 may access one or more data storages (e.g., the database(s) 420) to retrieve stored data to use in processing media content and to store results of processed media content.

The social network system 422 supports various social networking functions and services and makes these functions and services available to the messaging application server 416. To this end, the social network system 422 maintains and accesses an entity graph 604 (depicted in FIG. 6) within the database(s) 420. Examples of functions and services supported by the social network system 422 include the identification of other users of the networked system 400 with whom a particular user has relationships or whom the particular user is "following," and also the identification of other entities and interests of a particular user.

The messaging application server 416 may be responsible for generation and delivery of messages between users of client devices 410. The messaging application server 416 may utilize any one of a number of message delivery networks and platforms to deliver messages to users. For example, the messaging application server 416 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 5:
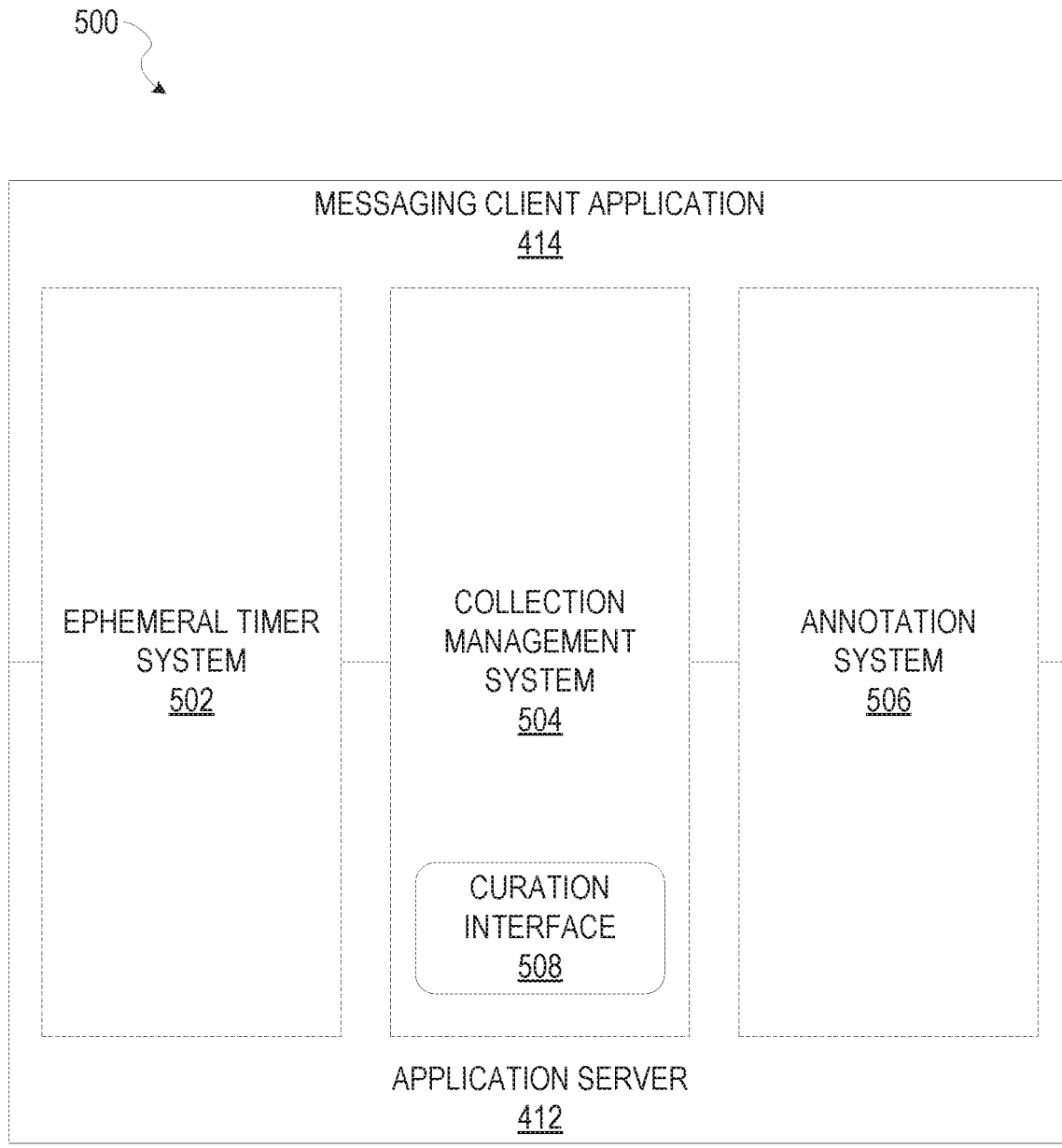
FIG. 5 is a block diagram illustrating further details regarding the messaging system, according to some example embodiments.

FIG. 5 is a block diagram 500 illustrating further details regarding the system 400, according to example embodiments. Specifically, the system 400 is shown to comprise the messaging client application 414 and the application server 412, which in turn embody a number of subsystems, namely an ephemeral timer system 502, a collection management system 504, and an annotation system 506.

The ephemeral timer system 502 is responsible for enforcing the temporary access to content permitted by the messaging client application 414 and the messaging application server 416. To this end, the ephemeral timer system 502 incorporates a number of timers that, based on duration and display parameters associated with a message, or a collection of messages (e.g., otherwise referred to herein as "media collections," "galleries," "message collections," "stories," and the like), selectively display and enable access to messages and associated content via the messaging client application 414.

The collection management system 504 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 504 may also be responsible for publishing an icon that provides notification of the existence of a particular collection to the user interface of the messaging client application 414.

The collection management system 504 furthermore includes a curation interface 508 that allows a collection manager to manage and curate a particular collection of content. For example, the curation interface 508 enables an event organizer to curate a collection of content relating to a specific event (e.g., delete inappropriate content or redundant messages). Additionally, the collection management system 504 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 508 operates to automatically make payments to such users for the use of their content.

The annotation system 506 provides various functions that enable a user to annotate or otherwise modify or edit media content associated with a message. For example, the annotation system 506 provides functions related to the generation and publishing of media overlays for messages processed by the networked system 400. In one example, the annotation system 506 operatively supplies a media overlay (e.g., a filter or media augmentation) to the messaging client application 414 based on a geolocation of the client device 410. In another example, the annotation system 506 operatively supplies a media overlay to the messaging client application 414 based on other information, such as social network information of the user of the client device 410. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 410. For example, the media overlay includes text that can be overlaid on top of a photograph taken by the client device 410. In another example, the media overlay includes an identification of a location overlay (e.g., Venice Beach), a name of a live event, a name of a merchant overlay (e.g., Beach Coffee House), or of a home of a user. In another example, the annotation system 506 uses the geolocation of the client device 410 to identify a media overlay that includes the name of a merchant at the geolocation of the client device 410. The media overlay may include other indicia associated with the merchant. The media overlays may be stored in the database(s) 420 and accessed through the database server 424.

The annotation system 506 may further enable a user to interact with an interactive message, such as by adding one or more media content items to the interactive message, as described in further detail below. In one example embodiment, the annotation system 506 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 506 provides a user-based publication platform that enables users to select a geolocation on a map and upload content associated with the selected geolocation. The user may also specify circumstances under which a particular media overlay is to be offered to other users. The annotation system 506 generates a media overlay that includes the uploaded content and associates the uploaded content with the selected geolocation.

In another example embodiment, the annotation system 506 provides a merchant-based publication platform that enables merchants to select a particular media overlay associated with a geolocation via a bidding process. For example, the annotation system 506 associates the media overlay of a highest-bidding merchant with a corresponding geolocation for a predefined amount of time.

Figure 6:
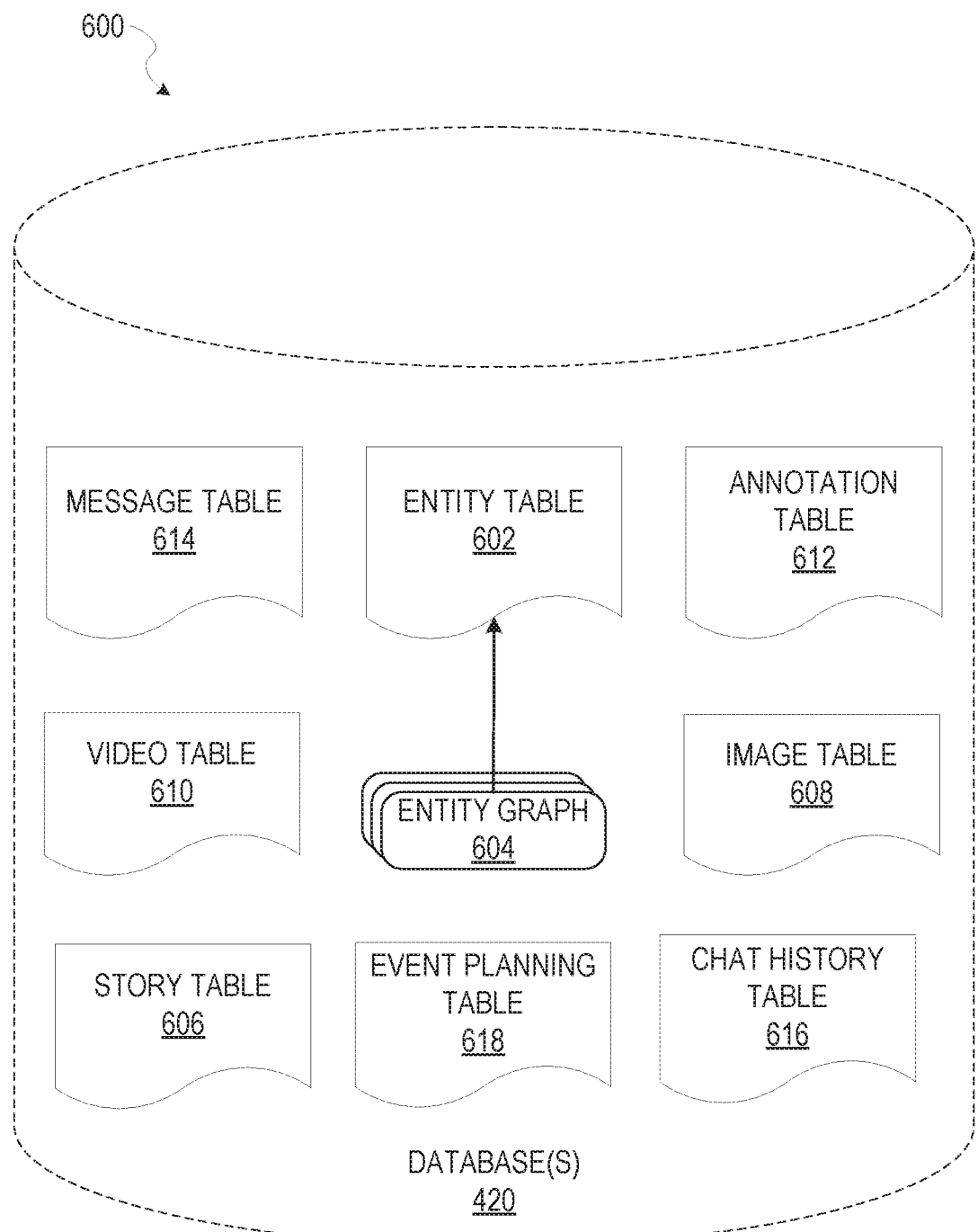
FIG. 6 is a schematic diagram illustrating data which may be stored in a database of a messaging server system, according to some example embodiments.

FIG. 6 is a schematic diagram 600 illustrating data which may be stored in the database(s) 420 of the server system 408, according to certain example embodiments. While the content of the database(s) 420 is shown to comprise a number of tables, it will be appreciated that the data could be stored in other types of data structures (e.g., as an object-oriented database).

The database 420 includes message data stored within a message table 614. An entity table 602 stores entity data, including an entity graph 604. Entities for which records are maintained within the entity table 602 may include individuals, corporate entities, organizations, objects, places, events, and so forth. Regardless of type, any entity regarding which the server system 408 stores data may be a recognized entity. Each entity is provided with a unique identifier, as well as an entity type identifier (not shown).

The entity graph 604 furthermore stores information regarding relationships and associations between entities. Such relationships may be social, professional (e.g., work at a common corporation or organization), interested-based, or activity-based, merely for example.

The database 420 also stores annotation data, in the example form of media overlays or filters, in an annotation table 612. Annotation data may also be referred to herein as "creative tools" or "interactive features." Annotation data may comprise predefined interactive messages to be provided to users.

Media overlays or filters, for which data is stored within the annotation table 612, are associated with and applied to videos (for which data is stored in a video table 610) and/or images (for which data is stored in an image table 608). Filters, in one example, are overlays that are displayed as overlaid on an image or video during presentation to a recipient user. Filters may be of various types, including user-selected filters from a gallery of filters presented to a sending user by the messaging client application 414 when the sending user is composing a message. Other types of filters include geolocation filters (also known as "geofilters"), which may be presented to a sending user based on geographic location. For example, geolocation filters specific to a neighborhood or special location may be presented within a user interface by the messaging client application 414, based on geolocation information determined by a GPS unit of the client device 410. Another type of filter is a data filter, which may be selectively presented to a sending user by the messaging client application 414, based on other inputs or information gathered by the client device 410 during the message creation process. Examples of data filters include a current temperature at a specific location, a current speed at which a sending user is traveling, a battery life for a client device 410, or the current time.

Other annotation data that may be stored within the annotation table 612 is so-called "lens" data. A "lens" may be a real-time special effect and sound that may be added to an image or a video.

As mentioned above, the video table 610 stores video data which, in one embodiment, is associated with messages for which records are maintained within the message table 614. Similarly, the image table 608 stores image data associated with messages for which message data is stored in the message table 614. The entity table 602 may associate various annotations from the annotation table 612 with various images and videos stored in the image table 608 and the video table 610.

A story table 606 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 602). A user may create a "personal story" in the form of a collection of content that has been created and sent/broadcast by that user. To this end, the user interface of the messaging client application 414 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 410 have location services enabled and are at a common event location at a particular time may, for example, be presented with an option, via a user interface of the messaging client application 414, to contribute content to a particular live story. The live story may be identified to the user by the messaging client application 414, based on his or her location. The end result is a "live story" told from a community perspective.

A further type of content collection is known as a "location story," which enables a user whose client device 410 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A chat history table 616 stores data related to text messages exchanged between users in a "chat" session via the messaging application. For example, the chat history table 616 stores all the messages exchanged between users, or all messages for a predefined time period (e.g., last hour, day, week, month, year), so that a user may view a history of text messages the user exchanged between one or more other users.

An event planning table 618 stores data related to an event. For example, the event planning table 618 stores details of an event, logged events (e.g., actions) corresponding to the event (e.g., when a user joins the event, when a user invites another users, when details of the event change), links to chat sessions for the event (e.g., a link to chat sessions in the chat history table 616), tokens for the event, and so forth.

Figure 7:
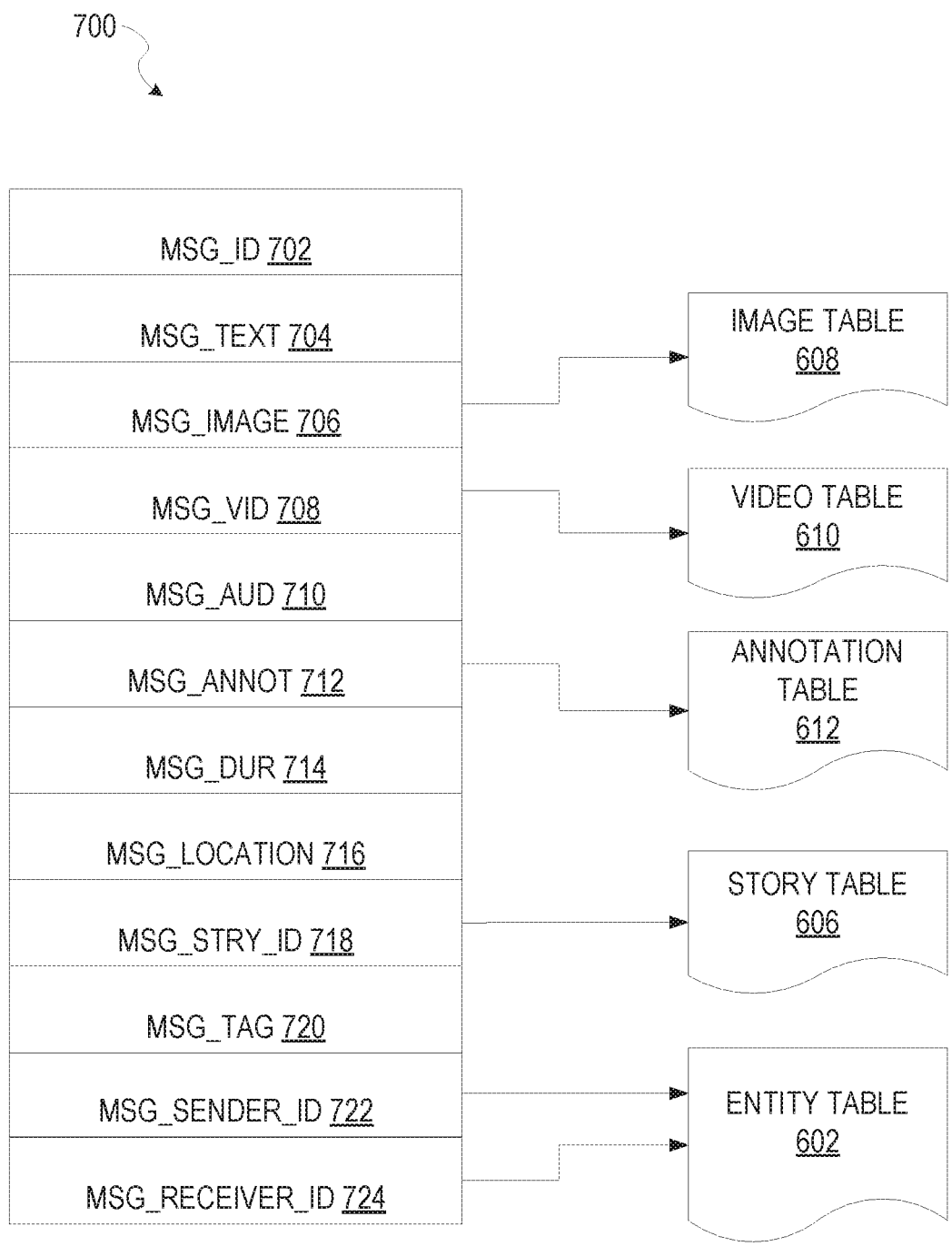
FIG. 7 is a schematic diagram illustrating a structure of a message, according to some embodiments, generated by a messaging client application for communication.

FIG. 7 is a schematic diagram illustrating a structure of a message 700, according to some embodiments, generated by a client application 414 for communication to a further client application 414 or the messaging application server 416. The content of a particular message 700 is used to populate the message table 614 stored within the database(s) 420, accessible by the messaging application server 416. Similarly, the content of a message 700 is stored in memory as "in-transit" or "in-flight" data of the client device 410 or the application server 412. The message 700 is shown to include the following components:

- A message identifier 702: a unique identifier that identifies the message 700.
- A message text payload 704: text, to be generated by a user via a user interface of the client device 410 and that is included in the message 700.
- A message image payload 706: image data, captured by a camera component of a client device 410 or retrieved from memory of a client device 410, and that is included in the message 700.
- A message video payload 708: video data, captured by a camera component or retrieved from a memory component of the client device 410 and that is included in the message 700.
- A message audio payload 710: audio data, captured by a microphone or retrieved from the memory component of the client device 410, and that is included in the message 700.
- Message annotations 712: annotation data (e.g., media overlays such as filters, stickers, or other enhancements) that represents annotations to be applied to the message image payload 706, message video payload 708, or message audio payload 710 of the message 700.
- A message duration parameter 714: a parameter value indicating, in seconds, the amount of time for which content of the message 700 (e.g., the message image payload 706, message video payload 708, and message audio payload 710) is to be presented or made accessible to a user via the messaging client application 414.
- A message geolocation parameter 716: geolocation data (e.g., latitudinal and longitudinal coordinates) associated with the content payload of the message 700. Multiple message geolocation parameter 716 values may be included in the payload, each of these parameter values being associated with respective content items included in the content (e.g., a specific image within the message image payload 706, or a specific video in the message video payload 708).
- A message story identifier 718: identifier values identifying one or more content collections (e.g., "stories") with which a particular content item in the message image payload 706 of the message 700 is associated. For example, multiple images within the message image payload 706 may each be associated with multiple content collections using identifier values.
- A message tag 720: each message 700 may be tagged with multiple tags, each of which is indicative of the subject matter of content included in the message payload. For example, where a particular image included in the message image payload 706 depicts an animal (e.g., a lion), a tag value may be included within the message tag 720 that is indicative of the relevant animal. Tag values may be generated manually, based on user input, or may be automatically generated using, for example, image recognition.
- A message sender identifier 722: an identifier (e.g., a messaging system identifier, email address, or device identifier) indicative of a user of the client device 410 on which the message 700 was generated and from which the message 700 was sent.
- A message receiver identifier 724: an identifier (e.g., a messaging system identifier, email address, or device identifier) indicative of a user of the client device 410 to which the message 700 is addressed.
- An event token (not shown): an identifier (e.g., randomly generated number) indicative of the event.

The contents (e.g., values) of the various components of the message 700 may be pointers to locations in tables within which content data values are stored. For example, an image value in the message image payload 706 may be a pointer to (or address of) a location within an image table 608. Similarly, values within the message video payload 708 may point to data stored within a video table 610, values stored within the message annotations 712 may point to data stored in an annotation table 612, values stored within the message story identifier 718 may point to data stored in a story table 606, and values stored within the message sender identifier 722 and the message receiver identifier 724 may point to user records stored within an entity table 602.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
accessing a stored application context of an application executing a current job on a computing device by a context-aware job scheduler of the computing device, wherein the scheduler manages a queue comprising a plurality of jobs for execution, each job of the plurality of jobs in the queue comprising an attribution tag indicating a module of the application that scheduled the respective job and wherein the queue is prioritized based on a first application context;
determining, by the scheduler, that the stored application context indicates a change from the first application context to a second application context during the execution of the application, wherein the second application context is different than the first application context;
based on determining that the stored application context indicates a change from the first application context to the second application context, performing operations by the scheduler during the execution of the current job of the application that comprise:
accessing a list of a plurality of attributions for the second application context comprising a plurality of assigned priority categories, each category of the assigned priority categories comprising at least one corresponding attribution tag, wherein the list of the plurality of attributions for the second application context comprising the plurality of assigned priority categories is generated based on priority scenarios associated with capabilities or a state of the computing device resulting in the most efficient execution of the application by the computing device;
re-prioritizing the plurality of jobs in the queue by sorting the plurality of jobs in an order according to the assigned priority categories for the second application context based on the attribution tag for each job of the plurality of jobs; and
setting the highest priority job in the re-prioritized queue as a next job for execution for the application; and
executing, by the computing device, the next job and the other jobs in the queue according to the re-prioritization for the second application context after the current job has finished executing.

2. The computer-implemented method of claim 1, further comprising:
determining, by the scheduler, that a third stored application context is the same as the second application context and keeping the highest priority job in the queue as the next job for execution for the application without re-prioritizing the queue.

3. The computer-implemented method of claim 1, wherein the change in application context is based on input made by a user interacting with the application.

4. The computer-implemented method of claim 1, wherein the first application context corresponds to a first function of the application, and the second application context corresponds to a second function of the application.

5. The computer-implemented method of claim 1, wherein accessing the list of attributions for the second application context comprises accessing a set of lists of attributions and selecting one list of the set of lists that corresponds to the second application context.

6. The computer-implemented method of claim 1, wherein the list of attributions for the second application context comprises priorities for jobs based on the corresponding attribution and the priorities comprise a high priority, a medium priority, and a low priority, and each priority comprises a list of attributions associated with the respective priority.

7. The computer-implemented method of claim 1, wherein the list of attributions for the second application context comprises at least one attribution type that will not be executed during the second application context.

8. The computer-implemented method of claim 1, further comprising:
receiving, by the computing device, a second job comprising a second attribution tag, the second job attribution tag corresponding to a module of the application;
analyzing, by the scheduler, the second attribution tag to determine that the second attribution tag does not correspond to a change in application context;
inserting, by the scheduler, the second job in the queue based on the second attribution tag using the list of attributions for a current application context; and
executing, by the computing device, the jobs in the queue based on the prioritization.

9. The computer-implemented method of claim 1, wherein at least one priority category of the assigned priority categories of the second application context comprises an indication that jobs with listed attributions should not be executed within the second application context.

10. The computer-implemented method of claim 9, wherein the jobs with listed attributions that should not be executed within the second application context are held in the queue until a change to a different application context occurs.

11. A computing device comprising:
a memory that stores instructions; and
one or more processors configured by the instructions to perform operations comprising:
accessing a stored application context of an application executing a current job on the computing device by a context-aware job scheduler of the computing device, wherein the scheduler manages a queue comprising a plurality of jobs for execution, each job of the plurality of jobs in the queue comprising an attribution tag indicating a module of the application that scheduled the respective job and wherein the queue is prioritized based on a first application context;

determining, by the scheduler, that the stored application context indicates a change from the first application context to a second application context, wherein the second application context is different than the first application context;

based on determining that the stored application context indicates a change from the first application context to the second application context, performing operations by the scheduler during the execution of the current job of the application that comprise:

accessing a list of a plurality of attributions for the second application context comprising a plurality of assigned priority categories, each category of the assigned priority categories comprising at least one corresponding attribution tag, wherein the list of the plurality of attributions for the second application context comprising the plurality of assigned priority categories is generated based on priority scenarios associated with capabilities or a state of the computing device resulting in the most efficient execution of the application by the computing device;

re-prioritizing the plurality of jobs in the queue by sorting the plurality of jobs in an order according to the assigned priority categories for the second application context based on the attribution tag for each job of the plurality of jobs; and setting the highest priority job in the re-prioritized queue as a next job for execution for the application; and executing, by the computing device, the next job and the other jobs in the queue according to the re-prioritization for the second application context after the current job has finished executing.

12. The computing device of claim 11, wherein the first application context corresponds to a first function of the application, and the second application context corresponds to a second function of the application.

13. The computing device of claim 11, wherein the list of attributions for the second application context comprises priorities for jobs based on the corresponding attribution.

14. The computing device of claim 11, wherein the list of attributions for the second application context comprises at least one attribution type that will not be executed during the second application context.

15. The computing device of claim 11, the operations further comprising:

receiving, by the computing device, a second job comprising a second attribution tag, the second job attribution tag corresponding to the module of the application;

analyzing, by the scheduler, the second attribution tag to determine that the second attribution tag does not correspond to a change in application context;

inserting, by the scheduler, the second job in the queue based on the second attribution tag using the list of attributions for a current application context; and executing, by the computing device, the jobs in the queue based on the prioritization.

16. A non-transitory computer-readable medium comprising instructions stored thereon that are executable by at least one processor to cause a computing device to perform operations comprising:

accessing a stored application context of an application executing a current job on the computing device by a context-aware job scheduler of the computing device, wherein the scheduler manages a queue comprising a plurality of jobs for execution, each job of the plurality of jobs in the queue comprising an attribution tag indicating a module of the application that scheduled the respective job and wherein the queue is prioritized based on a first application context;

determining, by the scheduler, that the stored application context indicates a change from the first application context to a second application context, wherein the second application context is different than the first application context;

based on determining that the stored application context indicates a change from the first application context to the second application context, performing operations by the scheduler during the execution of the current job of the application that comprise:

accessing a list of a plurality of attributions for the second application context comprising a plurality of assigned priority categories, each category of the assigned priority categories comprising at least one corresponding attribution tag, wherein the list of the plurality of attributions for the second application context comprising the plurality of assigned priority categories is generated based on priority scenarios associated with capabilities or a state of the computing device resulting in the most efficient execution of the application by the computing device;

re-prioritizing the plurality of jobs in the queue by sorting the plurality of jobs in an order according to the assigned priority categories for the second application context based on the attribution tag for each job of the plurality of jobs; and setting the highest priority job in the re-prioritized queue as a next job for execution for the application; and executing, by the computing device, the next job and the other jobs in the queue according to the re-prioritization for the second application context after the current job has finished executing.

* * * * *